United States Patent
Corio et al.

(10) Patent No.: US 6,296,325 B1
(45) Date of Patent: Oct. 2, 2001

(54) METHOD TO CONNECT AND DISTRIBUTE POWER TO AN ELECTROMECHANICAL BRAKING SYSTEM

(75) Inventors: Lawrence F. Corio; Robert L. Brundrett, both of Troy, OH (US); Mihai Ralea, Boonton, NJ (US); Rollin W. Brown, Colchester, VT (US); Jean Pierre Garcia, Colomiers; Cedrick Lauzier, Toulouse, both of (FR)

(73) Assignees: The B. F. Goodrich Company, Akron, OH (US); Aerospatiale Matra Airbus, Cedex (FR)

( * ) Notice: Subject to any disclaimer, the term of this patent is extended or adjusted under 35 U.S.C. 154(b) by 0 days.

(21) Appl. No.: 09/354,456

(22) Filed: Jul. 15, 1999

(51) Int. Cl.$^7$ ..................................................... B60T 13/66
(52) U.S. Cl. ................ 303/20; 303/122.04; 303/DIG. 9; 318/362; 244/110 R; 244/110 A
(58) Field of Search ........................ 303/122.04, 122.05, 303/DIG. 9, 20; 244/110 H, 110 R, 110 A, 111; 307/10.1; 318/362

(56) References Cited

U.S. PATENT DOCUMENTS

| | | |
|---|---|---|
| 2,869,807 | 1/1959 | Hyland et al. . |
| 2,957,658 | 10/1960 | Nichols . |
| 3,917,356 | 11/1975 | DeVlieg . |
| 3,920,204 | 11/1975 | Bissell et al. . |
| 3,926,479 | 12/1975 | Bissell et al. . |
| 4,062,507 | 12/1977 | Felder . |
| 4,493,210 | * 1/1985 | Fries et al. ....................... 303/122.08 |
| 4,683,538 | 7/1987 | Guichard . |
| 4,784,442 | * 11/1988 | Petersen .................................. 303/15 |
| 4,792,192 | 12/1988 | Tveitane . |
| 4,923,056 | 5/1990 | Nedelk . |
| 5,050,940 | 9/1991 | Bedford et al. . |
| 5,170,343 | 12/1992 | Matsuda . |
| 5,397,173 | 3/1995 | Bourguet . |
| 5,472,264 | 12/1995 | Klein et al. . |
| 5,754,021 | * 5/1998 | Kojima ................................. 307/10.1 |
| 5,952,799 | * 9/1999 | Maisch et al. .......................... 303/20 |
| 5,954,407 | * 9/1999 | Schramm et al. .................... 303/155 |
| 5,961,190 | 10/1999 | Brandmeier et al. . |
| 6,038,500 | 3/2000 | Weiss . |
| 6,081,081 | * 6/2000 | Maisch et al. ........................ 318/362 |
| 6,142,026 | 11/2000 | Ohashi et al. . |

FOREIGN PATENT DOCUMENTS

| | | |
|---|---|---|
| 4227157 | 8/1992 | (DE) . |
| 0229559 | 12/1986 | (EP) . |
| 0499515 | 2/1992 | (EP) . |
| 0614805 | 9/1994 | (EP) . |
| 9608396 | 3/1996 | (WO) . |

OTHER PUBLICATIONS

U.S. Patent Application No. 09/357341, filed Jul. 14, 1999.

* cited by examiner

Primary Examiner—Robert J. Oberleitner
Assistant Examiner—Robert A. Siconolfi
(74) Attorney, Agent, or Firm—Renner, Otto, Boisselle & Sklar, LLP

(57) ABSTRACT

A method is provided for arranging the components and power connection points within an electromechanical braking system architecture in order to better maintain isolation of the power busses, and thereby improve overall integrity of the system, while still meeting system redundancy, performance and safety requirements as in the past. In addition, a method is provided for connecting and efficiently using available power in emergency braking and parking modes.

11 Claims, 4 Drawing Sheets

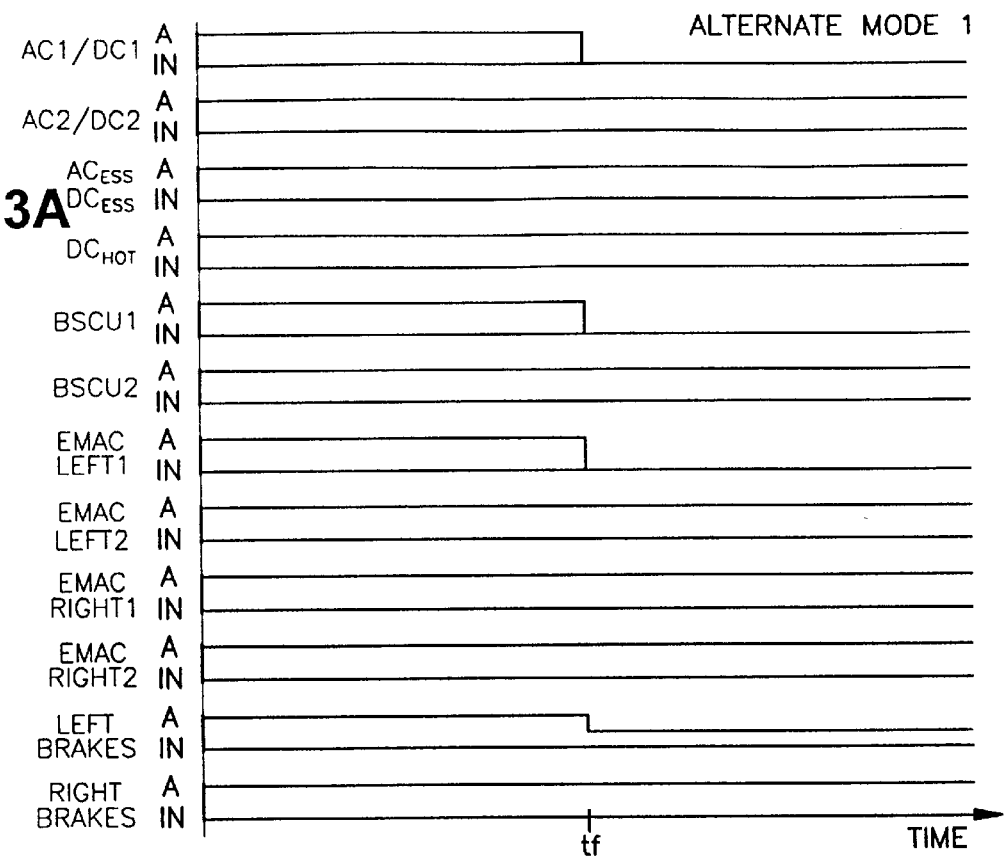
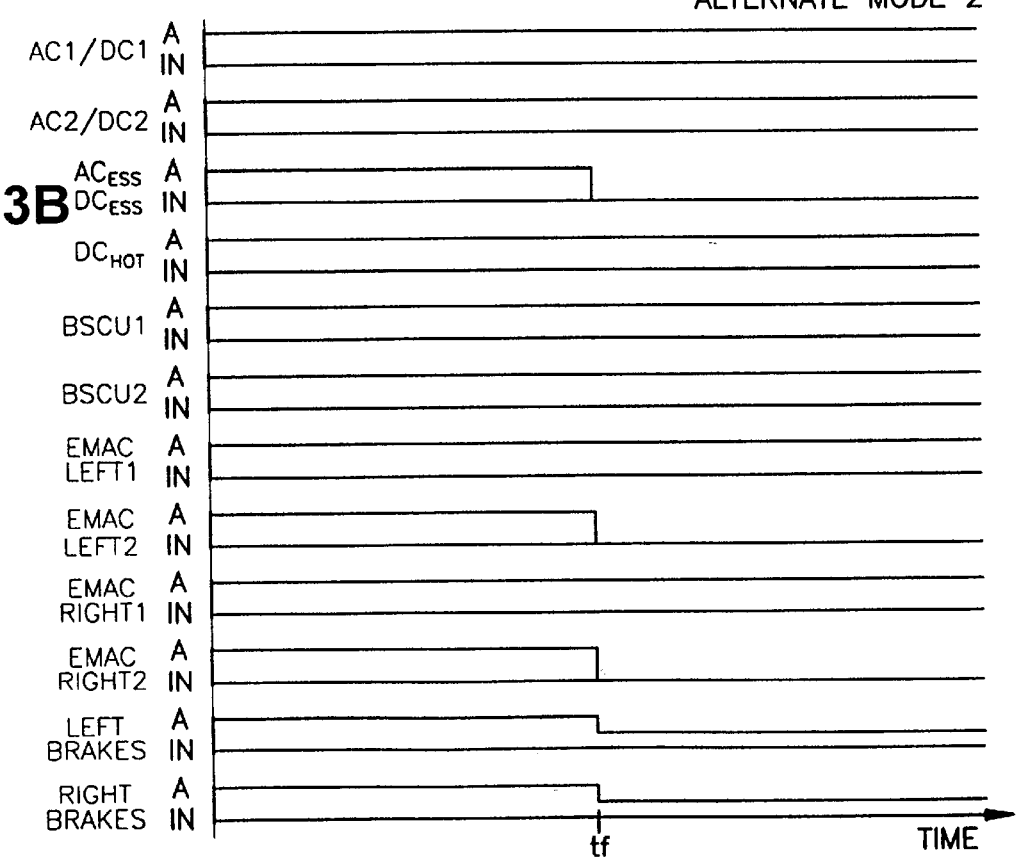

METHOD TO CONNECT AND DISTRIBUTE POWER TO AN ELECTROMECHANICAL BRAKING SYSTEM

TECHNICAL FIELD

The present invention relates generally to braking systems for vehicles, and more particularly to a method for connecting and distributing power to an electromechanical braking system in an aircraft.

BACKGROUND OF THE INVENTION

Various types of braking systems are known. For example, hydraulic, pneumatic and electromechanical braking systems have been developed for different applications. The aerospace industry presents unique operational and safety issues with regard to many braking systems. For example, the need for system redundancy in case of a system or component failure is particularly germane to braking operations of an aircraft.

Brake system architectures for aircraft have been developed previously which meet different redundancy, performance and safety requirements. Such architectures include, for example, redundant digital brake control units (BSCUs) which carry out the brake control and antiskid processing functions. In addition, such architectures include, for example, redundant electromechanical actuator controllers (EMACs) which convert commands from the BSCUs to brake actuator forces. Each EMAC provides electrical power to electromechanical brake actuators included within the brakes for the wheels of the aircraft.

FIG. 1 represents such a brake system architecture which has been developed in the past. The architecture, generally designated in FIG. 1 as braking system 30, includes the aforementioned BSCUs and EMACs which are represented collectively as an electromechanical braking controller 60. The controller 60 receives as its primary inputs i) the brake command signals from pilot brake pedal transducers 46 located in the cockpit of the aircraft, and ii) the outputs of torque and wheel speed sensors 62 included as part of a brake 34 on each wheel 36 of the aircraft.

The braking system 30 receives power from three primary power busses and a secondary power buss included within the aircraft. As is known, an aircraft oftentimes will include multiple power busses. In the exemplary embodiment, the aircraft includes primary power busses PWR1, PWR2 and PWRess. Each power buss preferably is independent of one or more of the other power busses to provide a level of redundancy. For example, the power buss PWR1 consists of an alternating-current (AC) power source AC1 and a commonly generated direct-current (DC) power source DC1. Similarly, the power buss PWR2 consists of an AC power source AC2 and a commonly generated DC power source DC2; and the power buss PWRess consists of an AC power source ACess and commonly generated DC power source DCess.

The power buss PWR1 (i.e., AC1 and DC1) may be derived from power generated by the left wing engine in the aircraft, for example. Similarly, the power buss PWR2 (i.e., AC2 and DC2) may be derived from power generated by the right wing engine. In this manner, if the left wing engine or the right wing engine fails, power is still available to the system 30 via the power buss corresponding to the other engine.

The power buss PWRess (i.e., ACess and DCess) may be derived from power generated by the parallel combination of the left wing engine and the right wing engine. In such manner, power from the power buss PWRess will still be available even if one of the engines fail. In addition, DCess can be powered by a battery in case of total loss of the aircraft engines.

More particularly, the aircraft further includes a DC power buss supplied by a battery on board the aircraft. This power is represented by a DChot power source. The battery may be charged via power from one of the other power sources, or may be charged separately on the ground. The DChot power source is configured to provide battery power to the DCess power buss in the event of loss of AC power.

Various circumstances can arise where power from one or more of the power busses may become unavailable. For example, the left wing engine or the right wing engine could fail causing the PWR1 (AC1/DC1) and PWR2 (AC2/DC2) power sources to go down, respectively. Alternatively, power generating equipment such as a generator, inverter, or other form of power converter could fail on one of the respective power busses resulting in the AC1/DC1, AC2/DC2 and/or ACess/DCess power sources becoming unavailable. In addition, a failure can occur in the cabling providing the power from the respective power sources to the system 30, thus effectively causing the respective power source to no longer be available. For this reason, the routing of the power cables for the different busses preferably occurs along different routes throughout the plane to avoid catastrophic failure on all the power buss cables at the same time.

As mentioned above, such previously developed systems have been shown to satisfy system redundancy, performance and safety requirements associated within an aircraft braking system. Nevertheless, there is a desire to improve the capabilities of such braking systems with respect to other possible failures within an aircraft or other vehicle. For example, there is a strong need in the art for a method for partitioning the power buss(es) within the braking system to reduce the risk of impairing or failing a power buss or supply as a consequence of a system or component failure. Moreover, there is a strong need in the art for a method for further maintaining brake control in an emergency or parking mode despite loss of a power buss and or BSCU, for example.

SUMMARY OF THE INVENTION

The present invention provides a manner for arranging the components and power connection points within a braking system architecture in order to better maintain isolation of the power busses, and thereby improve overall integrity of the system, while still meeting system redundancy, performance and safety requirements as in the past. In addition, the invention provides a manner for connecting and efficiently using available power in emergency braking and parking modes.

In accordance with one particular aspect of the invention, a method is provided for distributing power to an electromechanical braking system. The braking system includes a plurality of brake actuators for effecting a braking torque on wheels of a vehicle, a plurality of electromechanical actuator controllers (EMACs) for providing drive control of the brake actuators in response to brake command signals, and at least one brake control unit (BSCU) for converting an input brake command signal into the brake command signals which are provided to the EMACs. The method includes the steps of configuring at least two of the plurality of EMACs to function redundantly in providing drive control to the brake actuators in response to the brake command signals;

and providing power to the at least two EMACs via respective power busses having different power sources.

According to another aspect of the invention, a method for distributing power to an electromechanical braking system are provided in which the system includes a plurality of brake actuators for effecting a braking torque on wheels of a vehicle, at least one electromechanical actuator controller (EMAC) for providing drive control of the brake actuators in response to brake command signals, and a plurality of brake control units (BSCUs) for converting an input brake command signal into the brake command signals which are provided to the at least one EMAC. The method includes the steps of configuring at least two of the plurality of BSCUs to function redundantly in providing brake command signals to the at least one EMAC in response to the input brake command signal; and providing power to the at least two BSCUs via respective power busses having different power sources.

In accordance with yet another aspect of the invention, a method for controlling braking in an electromechanical braking system comprising at least one brake actuator for effecting a braking torque on a wheel of a vehicle, at least one electromechanical actuator controller (EMAC) for providing drive control of the brake actuator in response to brake command signals, and at least one brake control unit (BSCU) for converting an input brake command signal into the brake command signals which are provided to the EMAC, the BSCU providing antiskid operations in relation to the input brake command signal, is provided. The method includes the steps of under predefined normal braking conditions, inputting the input brake command signal to the BSCU to obtain a brake command signal which is provided to the EMAC to implement braking; and under predefined emergency or parking conditions, inputting the input brake command signal directly to the EMAC so as to bypass the BSCU and implement braking.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3A is a timing diagram illustrating operation of the electromechanical braking system in a first alternate braking mode in which a primary AC power source has failed;

FIG. 3B is a timing diagram illustrating operation of the electromechanical braking system in a second alternate braking mode in which an essential primary AC power source has failed;

DESCRIPTION OF THE PREFERRED EMBODIMENT

The present invention will now be described with reference to the drawings, wherein like reference labels are used to refer to like elements throughout.

Figure 2:
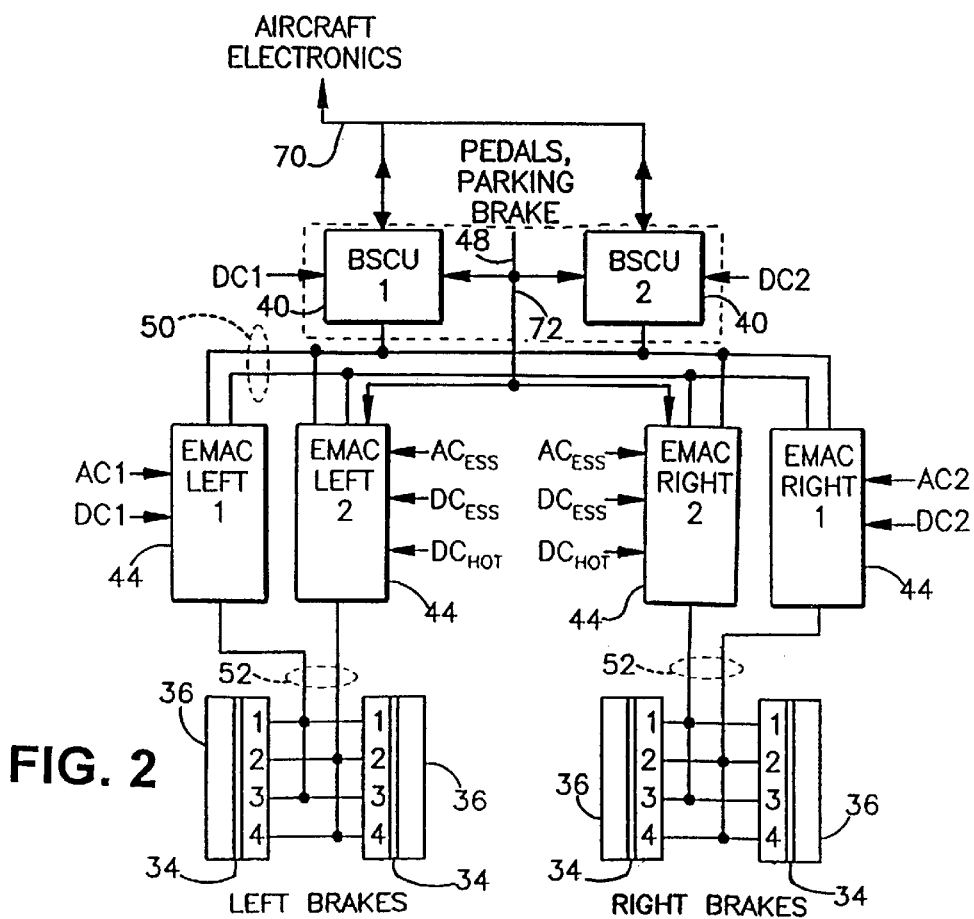
FIG. 2 is a detailed block diagram of the electromechanical braking system which incorporates the features of the present invention.

Referring initially to FIG. 2, an electromechanical braking system 30 is shown. As will be explained in more detail below, the system 30 utilizes power buss partitioning in accordance with the present invention in order to reduce and/or eliminate the risk of impairing or failing a power buss or supply as the consequence of a system or component failure. In addition, the invention present provides a method for connecting and efficiently using the available power in the system 30 in parking and emergency modes.

The braking system 30 as shown in FIG. 2 has an exemplary architecture for satisfying typical redundancy, performance and safety requirements within an aircraft. Such architecture is presented by way of example to illustrate the context in which the principles of the present invention may be employed. It will be appreciated, however, that the present invention has utility with other architectures and is not limited to the particular architecture shown. The manner in which the present invention provides for power buss partitioning and efficient braking in the parking and emergency modes can be applied to other architectures as well.

According to the exemplary architecture, the system 30 includes two BSCUs 40 designated BSCU1 and BSCU2, respectively. BSCU1 and BSCU2 are redundant and are both configured to provide an input/output interface to the aircraft electronics within the cockpit, for example, via a bus 70. In addition, BSCU1 and BSCU2 each contain circuitry for performing top level brake control and antiskid algorithm processing functions. BSCU1 and BSCU2 each receive proportional brake command signals from the transducers 46 via cable 48.

BSCU1 and BSCU2 are each designed to receive the proportional brake command signals from the transducers 46 and process the signals based on the aforementioned brake control and antiskid algorithms to produce a brake command signal which is provided to EMACs 44. The particular brake control and antiskid algorithms employed by the BSCUs 40 can be conventional, and hence further detail based thereon is largely omitted in the present description for sake of brevity.

BSCU1 and BSCU2 each provide brake commands and otherwise communicate with the EMACs 44 via a communication bus 50. The system 30 includes four redundant EMACs 44 respectively labeled EMAC Left1, EMAC Left2, EMAC Right1 and EMAC Right2. As shown in FIG. 2, each EMAC 44 is coupled to the communication bus 50 so as to be able to receive brake commands from each of the BSCUs 40 and otherwise communicate with the other devices coupled to the bus 50. The EMACs 44 receive left and right brake commands from the BSCUs 40 and provide control signals to actuator modules within the brakes 34 to drive the actuator modules to their commanded position. In this manner, controlled braking may be effected.

Each brake 34 included in the system 30 includes, for example, four separate actuator modules (designated by numerals 1–4). Each actuator module 1–4 includes an electric motor and actuator (not shown) which is driven in response to electrical control signals provided by a respective EMAC 44 to exert mechanical braking torque on a respective wheel 36. Each EMAC 44 controls half of the actuator modules 1–4 for the wheels 36 on either the left wing landing gear or the right wing landing gear. Thus, EMAC Left1 provides control to actuator modules 1 and 3 of each of the wheels 36 in the left side landing gear (representing the left brakes) via cable 52. Similarly, EMAC Left2 has its output coupled to the remaining actuator modules 2 and 4 of the wheels 36 in the left side landing gear via cable 52. EMAC Right1 similarly provides power to the actuator modules 1 and 3 for the wheels 36 in the right side landing gear (representing the right brakes), and EMAC Right2 provides power to the remaining actuator modules 2 and 4 in the right side landing gear via another cable 52.

Thus, when the system 30 is fully operational (i.e., during normal operation) each of the EMACs 44 receives brake commands from BSCU1 and BSCU2 which will be generally redundant. Nevertheless, the EMACs 44 may be configured to give commands provided by BSCU1 priority or vice versa. In the event commands are not received from one of the BSCUs 40, the EMACs 44 are configured to default to the other BSCU 40. During normal operation, all four actuator modules 1–4 will receive brake control signals from their respective EMAC 44 to provide full braking.

Figure 1:
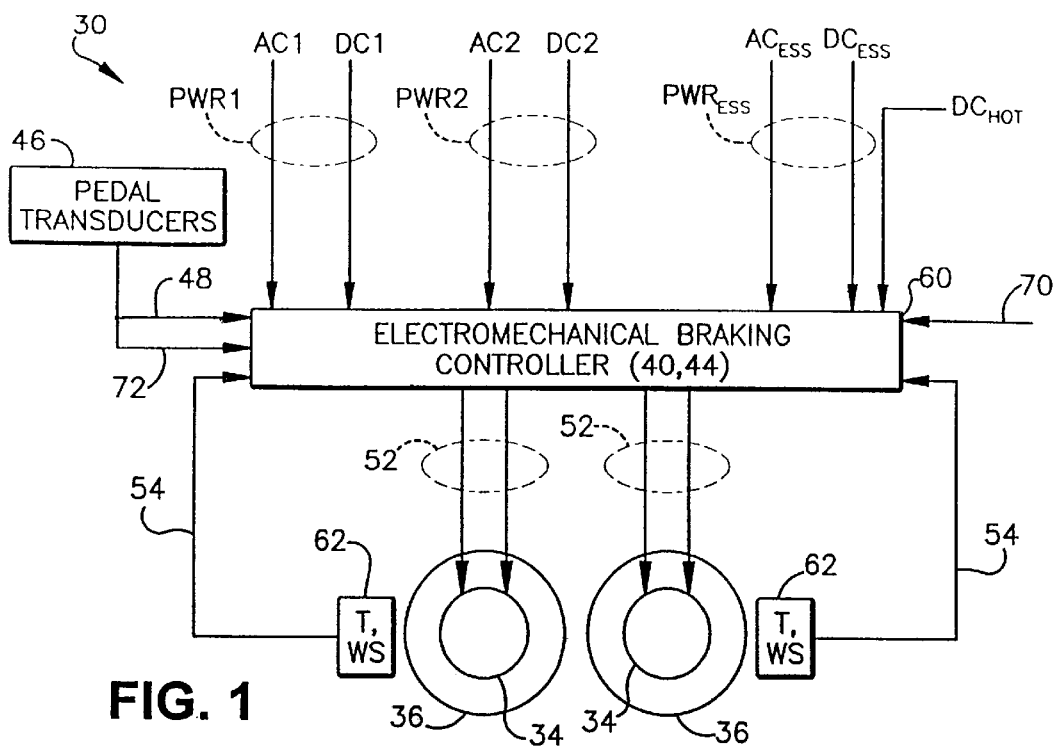
FIG. 1 is a general block diagram representative of known electromechanical braking systems.

Although not shown in FIG. 2, the outputs of the wheel speed and torque sensors 62 for each brake 34 are coupled to the respective EMACs 44 via the cables 54 (FIG. 1). The EMACs 44 are configured to condition the signals and provide the measured wheel speed and torque to the BSCUs 40 via the communication bus 50. The BSCUs 40 in turn use such information in a conventional manner for carrying out brake control and antiskid processing.

According to the present invention, EMAC Left2 and EMAC Right2 differ from the remaining EMACs in that they also receive left and right proportional brake commands directly from the transducers 46 via a separate cable 72. As is discussed in more detail below, such direct input of the brake commands from the transducers 46 is used during emergency braking operations. Also, EMAC Left2 and EMAC Right2 receive a parking brake control signal from a switch located in the cockpit via the cable 72 for carrying out a parking brake operation as described below.

Both BSCU1 and BSCU2 are designed to operate on DC power. According to the present invention, however, BSCU1 is coupled to the DC1 power source and BSCU2 is coupled to a different power source, namely the DC2 power source. Thus, different power busses (e.g., PWR1 and PWR2) are used to supply operating power to the respective BSCUs 40. Similarly, EMAC Left1 and EMAC Right1 are designed to operate on power from the different power busses PWR1 and PWR2, respectively. Specifically, EMAC Left1 receives AC operating power from the AC1 source and DC operating power from the DC1 source. EMAC Right1 receives AC operating power from the AC2 source and DC operating power from the DC2 source.

Also according to the present invention, EMAC Left2 and EMAC Right2 are configured to operate on power from the PWRess power buss. Specifically, both EMAC Left2 and EMAC Right2 receive AC operating power from the ACess source and DC operating power from the DCess source. In addition, EMAC Left2 and EMAC Right2 are designed to operate in an emergency mode based on power provided by the DChot bus as discussed below.

The system 30 is designed to carry out built-in testing among the EMACs 44 to detect the loss of power from any of the primary power busses PWR1, PWR2 and PWRess. Such built-in testing can be carried out by configuring the EMACs 44 to poll each other via the communication bus 50, for example. If an EMAC 44 fails to respond to polling by another, for example, it can be assumed that power from the particular power buss servicing the EMAC 44 is unavailable or that the EMAC 44 itself has failed. The polling EMACs 44 then communicate such information to the BSCUs 40 via the bus 50. The BSCUs 40 in turn command the functioning EMACs 44 to revert to an alternate mode of braking. Other techniques for detecting the loss of power on one of the power busses or the failure of one of the components can be used as will be appreciated.

Braking Modes

The braking system 30 includes five primary operating modes including a normal mode, alternate mode 1, alternate mode 2, emergency mode and park (ultimate) mode. In each mode braking is available despite failure of a power buss, etc., as will now be explained with reference to FIGS. 3A–3D and 4A–4B.

FIGS. 3A–3D and 4A–4B illustrate the state of respective power busses and components within the system 30 with respect to time during different failure modes. A line level "A" in the figures indicates that the power buss or component is available and operational. A line level "IN" indicates that the power buss or component is inactive or unavailable. With respect to a line level between "A" and "IN", this indicates that the brakes or components are partially available or operational as will be further described below.

Normal Mode

Normal mode operation is defined as operation during which power from all the primary power busses PWR1, PWR2 and PWRess is available, and the BSCUs 40 and EMACs 44 are functional. Referring initially to FIG. 3A, normal mode operation is shown at a time prior to a failure time tf. As is shown, all of the power busses are available, the BSCUs 40 and EMACs 44 are receiving power and are operational. Moreover, each of the actuator modules 1–4 in the left brakes and right brakes are powered and operational.

Alternate Mode 1

Alternate mode 1 is defined as operation during which the power buss PWR1 or PWR2 is unavailable due to failure, for example, but the power buss PWRess remains available.

FIG. 3A illustrates a particular example where, at a failure time tf, the power buss PWR1 (AC1/DC1) fails. As noted above, such failure may occur due to engine failure, power converter failure, broken power cable, etc. Since BSCU1 is powered by the power buss PWR1, BSCU1 will stop functioning at time tf as represented in FIG. 3A. However, since BSCU1 and BSCU2 are redundant and BSCU2 receives operating power from the power buss PWR2 (AC2/DC2), brake control operation and antiskid processing may still be carried out.

Since BSCU2 receives operating power from power buss PWR2 and therefore does not require power from power buss PWR1, BSCU2 is isolated from power buss PWR1 as well as BSCU1. Thus, a failure of power buss PWR1 and/or BSCU1 will not produce a consequential failure of power buss PWR2. For example, a short circuit or breakdown of the power buss PWR1 and/or BSCU1 will not result in a catastrophic failure of power buss PWR2. Of course, the same is true with respect to the reverse situation if BSCU2 and/or PWR2 were to experience a failure. Power bus PWR1 would remain available to BSCU1 as it is isolated within the braking system 30 from the failed BSCU2 and/or power buss PWR.

In the example of FIG. 3A, since EMAC Left1 receives power from the power buss PWR1 it also becomes unavailable at time tf. Because EMAC Left1 becomes unavailable, the actuator modules 1 and 3 controlled by the EMAC in the left brakes are disabled. Nevertheless, each of the remaining EMACs 44 remain operational. Accordingly, two of the four actuator modules (i.e., 2 and 4) remain available for braking as controlled by the EMAC Left2. Ordinarily this would result in a loss of 50% of the total available braking force on the left wheels 36. However, the EMACs 44 are designed to increase the upper force limit exerted by the respective actuator modules 1–4 in the alternate mode.

The risk that the power buss PWR2 may become disabled as a consequence of the failure of power buss PWR1 (or the failure of EMAC Left1 itself) is avoided in accordance with the present invention. The remaining EMACs 44 and the power provided thereto are isolated within the system 30 from the power buss PWR1.

Similar operation to that shown in FIG. 3A would occur if the power buss PWR2 (AC2/DC2) failed rather than the power buss PWR1. In such case, however, BSCU1 would remain operational and BSCU2 would stop functioning. Similarly, EMAC Right1 would stop functioning and the remaining EMACs 44 would continue to operate. The actuator modules 1 and 3 in the right brakes would be disabled, but the EMAC Right2 would increase the maximum force limit of the actuator modules 2 and 4 similar to that previously described.

Alternate Mode 2

Alternate mode 2 is defined as operation during which the power buss PWRess is unavailable due to failure, for example, but the power busses PWR1 and PWR2 remain available.

For example, FIG. 3B illustrates how the power buss PWRess fails at time tf while power busses PWR1 and PWR2 remain active. In such case, EMAC Left2 and EMAC Right2 are considered unavailable by the system 30 as shown. Although EMAC Left2 and EMAC Right2 receive power via the DChot bus, such power is utilized only in the emergency mode discussed below.

Since EMAC Left2 and EMAC Right2 are not operational, the actuator modules 2 and 4 for each of the brakes 34 for the left and right wheels 36 are disabled. In this case, only 50% of the actuator modules 1–4 are active for each of the brakes 34. Nevertheless, failure of the PWRess is detected and the BSCUs 40 instruct the remaining EMAC Left1 and EMAC Right1 to increase the force limits of the active actuator modules 1 and 3 so as to provide at least a majority of the normal braking force. Again, this reduced braking function in the left and right brakes is reflected in FIG. 4B.

It will again be appreciated that according to the present invention, failure of the power buss PWRess and/or EMAC Left2 or EMAC Right2 will not result in a consequential failure of the power buss PWR1 or PWR2 or the remaining EMACs since the power from power buss PWRess is provided separately to the EMAC Left2 and EMAC Right2. The power to the EMACs Left1 and Right1 is provided separately by the other power busses, and hence avoids consequential failure. Again, the reverse is also true.

Emergency Mode

The emergency mode is defined as failure of all the primary power sources PWR1, PWR2 and PWRess. Only the DCess power source remains available by virtue of battery power provided via the DChot power.

Figure 3C:
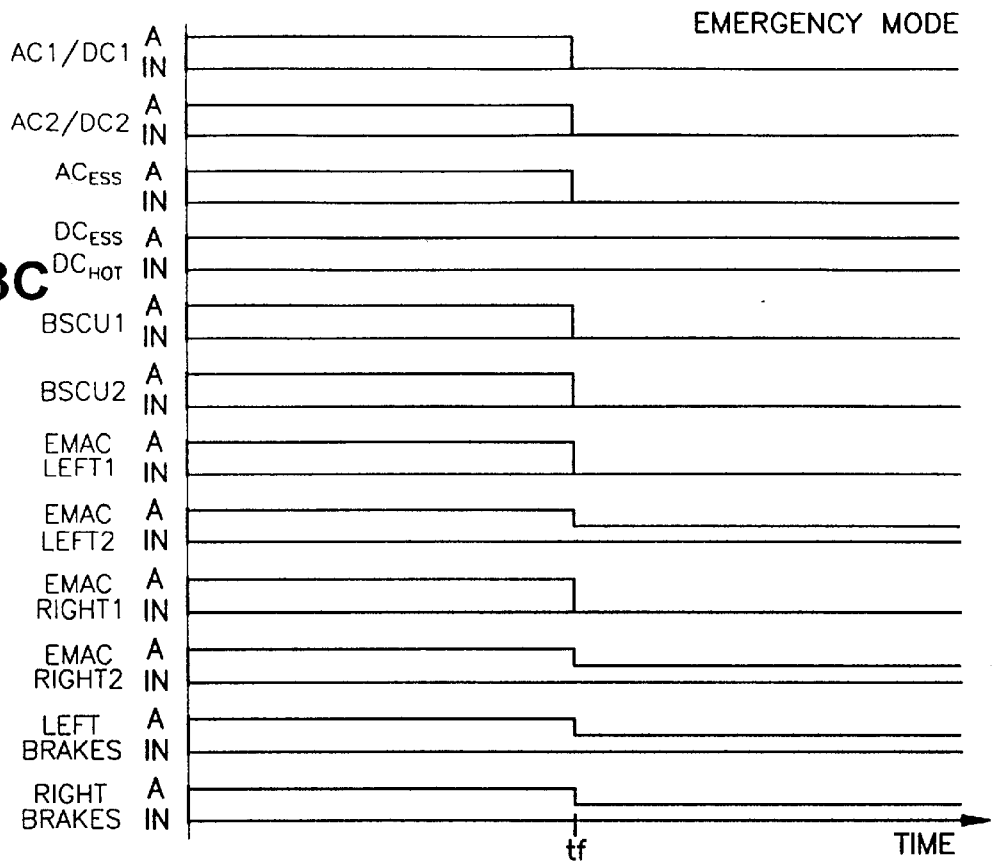
FIG. 3C is a timing diagram illustrating operation of the electromechanical braking system in an emergency braking mode in which all primary power sources have failed.

FIG. 3C illustrates the emergency mode where all the primary power sources PWR1, PWR2 and PWRess fail at or before time tf. In such case, both BSCUs 40 become disabled as does EMAC Left1 and EMAC Right1. Only EMAC Left2 and EMAC Right2 remain active on a limited basis by virtue of the DCess power source. EMAC Left2 and EMAC Right2 are configured to recognize such condition and are designed to operate under condition on the brake commands provided directed thereto from the transducers 46 via cable 72.

Under such condition, only actuator modules 2 and 4 remain active in each brake 34. According to the present invention, EMAC Left2 and EMAC Right2 are designed to use the pedal input commands received directly from the transducers 46 to achieve proportional brake force application using the actuator modules 2 and 4 in each brake 34. Such pedal input commands may derive power from the DCess source via connecting cables 72 and 48, and the system 30 preferably is designed to provide the most direct electrical path between the transducers 46 and the brakes 34 to minimize the number of intermediate components, and hence decrease the possibility of component failure in that path.

Since only actuator modules 2 and 4 remain active in each brake, it is preferable that EMAC Left2 and EMAC Right2 be configured to increase the upper force limit of each actuator module under such condition. However, care should be taken to maximize the amount of braking achievable in view of the limited amount of power available via the DCess source. It is noted that in the emergency mode, both BSCUs 40 are disabled, and hence antiskid protection is not available.

Park (Ultimate) Mode

Figure 3D:
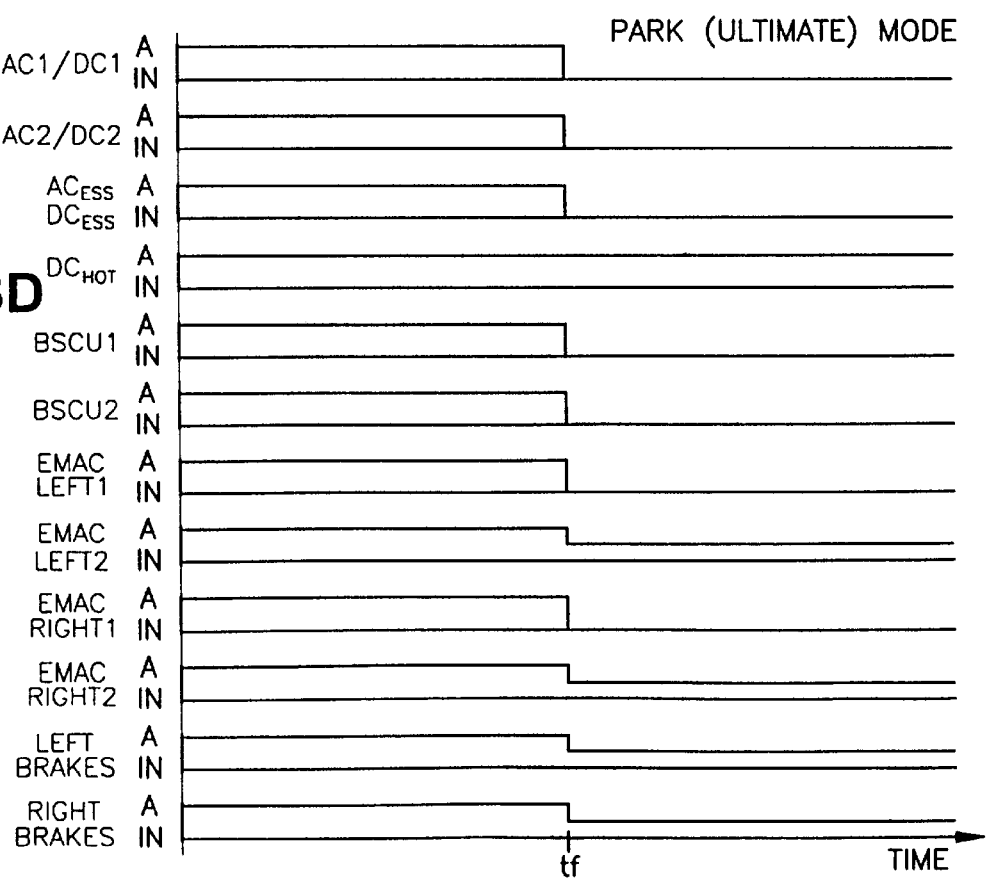
FIG. 3D is a timing diagram illustrating operation of the electromechanical braking system in a park (ultimate) braking mode in which all primary power sources are unavailable.

In the park (ultimate) mode, only power from the DChot source may be available as represented in FIG. 3D. This may be because the aircraft is on the ground with the remaining power systems shut down. Alternatively, all the primary power busses PWR1, PWR2 and PWRess (including DCess) may be unavailable or have failed similar to the emergency mode discussed above.

For the same reasons discussed above in relation to FIG. 3C and the emergency mode, only EMAC Left2 and EMAC Right2 remain active in the park (ultimate) mode. Moreover, these particular EMACs are only partially active in the sense that they are operating based on power from the DChot source. Operation differs from the emergency mode in the following respects.

The cockpit includes a parking brake switch selectively activated by the pilot. The parking brake switch is coupled to EMAC Left2 and EMAC Right2 via the cables 48 and 72, for example. EMAC Left2 and EMAC Right2 are both configured to provide a predetermined fixed braking force via the enabled actuator modules 2 and 4 in each of the brakes 34 upon closing of the parking brake switch. Power from the DChot source is used only to actuate the actuator modules 2 and 4 into position. Thereafter, a mechanical holding device within the actuator module holds the actuator mechanism in place so as to no longer require power from the DChot source. In this manner, the park mode uses power only during activation or when the park brake is released in order to conserve power in the aircraft battery.

Release of the parking brake is implemented by removing the brake clamping force as a result of the EMAC Left2 and EMAC Right2 disabling the mechanical holding device and driving each actuator module 2 and 4 to a running clearance position. Specifically, the parking brake switch in the cockpit being moved to a release position causes the EMAC Left2 and EMAC Right2 to release the parking brake.

In the event the power buss PWRess is available, the system can be designed to operate on power from DCess in order not to discharge the aircraft battery serving as the DChot Source.

The park (ultimate) mode is considered to be a final means of applying brakes in an aircraft emergency situation in order to stop the aircraft. The EMACs are configured preferably such that the park mode overrides any normal braking commands unless the normal braking command torque level is higher than the park torque level. If the remainder of the system 30 fails due to the BSCUs 40 or the main power busses PWR1, PWR2 and PWRess failing, for example, it is noted that operation of the park (ultimate) mode is neither prevented nor delayed.

Figure 4A:
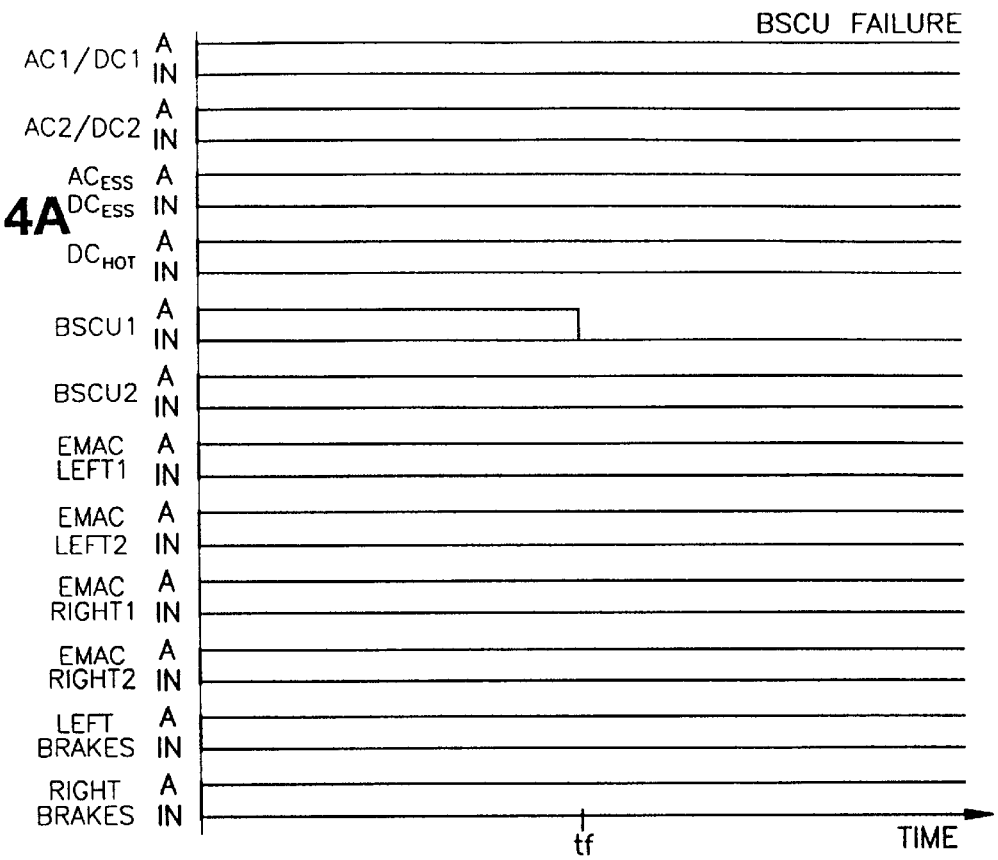
FIG. 4A is a timing diagram illustrating operation of the electromechanical braking system during failure of a brake system control unit.

Referring now to FIG. 4A, a case where one of the BSCUs 40 fails is illustrated. For example, FIG. 4A shows how BSCU1 may fail at time tf due to component failure. Since BSCU1 and BSCU2 are redundant, the EMACs 44 will continue to receive brake commands from BSCU2. Hence, the system 30 will continue to operate in a normal mode.

The failure of the BSCU1 may create a short circuit or other adverse condition which could cause the power buss PWR1 to fail due to its connection to BSCU1. In accordance with the present invention, however, BSCU2 and the power buss PWR2 are isolated within the braking system 30. Thus, failure of BSCU1 and/or power buss PWR1 will not result in a consequential failure of power buss PWR2. The same principles apply if BSCU2 was to fail instead.

Although not shown, if BSCU2 was also to fail for some reason (e.g., component failure), the EMACs 44 are configured to revert to emergency mode operation. More specifically, in the absence of commands from the BSCUs 40, EMAC Left2 and EMAC Right2 are configured to operate proportionally in the emergency mode based on the direct inputs from the brake pedal transducers 46 as described above.

Figure 4B:
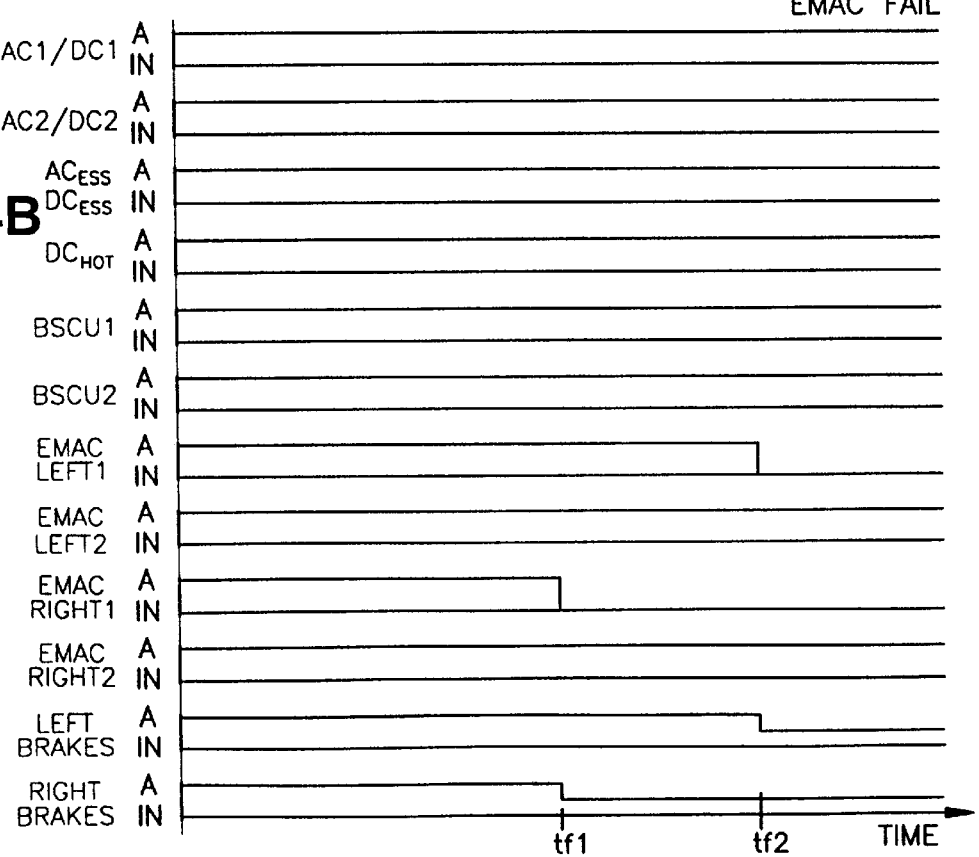
FIG. 4B is a timing diagram illustrating operation of the electromechanical braking system during failure of an electromechanical actuator controller.

FIG. 4B illustrates how if EMAC Right1 fails at time tf1 due to component failure, for example, the remaining EMACs 44 continue to operate such that the right brakes continue to provide at least partial braking. If EMAC Left1 were to then fail at time tf2, for example, partial braking would again still be available in the left brakes. Thus, the present invention provides protection against component failure much in the same way as protection against failure of the power systems.

As in the case of a failed BSCU, the failure of one of the EMACs could potentially produce a short circuit or other adverse condition which could cause its respective power buss connected thereto to fail. In accordance with the present invention, however, the remaining EMACs in addition to providing for redundancy, receive power from a power buss which is isolated from the failed power buss within the braking system 30. Thus, a consequential failure of the remaining power buss(es) is avoided.

Although the invention has been shown and described with respect to certain preferred embodiments, it is obvious that equivalents and modifications will occur to others skilled in the art upon the reading and understanding of the specification. The present invention includes all such equivalents and modifications.

What is claimed:

1. A method for distributing power to an electromechanical braking system comprising a plurality of brake actuators for effecting a braking torque on wheels of a vehicle, a plurality of electromechanical actuator controllers (EMACs) for providing drive control of the brake actuators in response to brake command signals, and at least one brake control unit (BSCU) for converting an input brake command signal into the brake command signals which are provided to the EMACs, the method comprising:

configuring at least two of the plurality of EMACs to function redundantly in providing drive control to the brake actuators of a same wheel in response to the brake command signals; and providing power to the at least two EMACs via respective power busses having different power sources.

2. The method of claim 1, wherein the vehicle is an aircraft.

3. The method of claim 2, wherein the two EMACs receive power from power busses based on different engines included in the aircraft.

4. The method of claim 1, wherein the system includes a plurality of BSCUs, and further comprising the steps of configuring at least two of the BSCUs to function redundantly in providing brake command signals to the EMACs, and providing power to the at least two BSCUs via respective power busses having different power sources.

5. The method of claim 4, wherein a first of the respective power busses provides power to a first of the redundant EMACs and a first of the redundant BSCUs, and a second of the respective power busses provides power to a second of the redundant EMACs and a second of the redundant BSCUs.

6. A method for distributing power to an electromechanical braking system comprising a plurality of brake actuators for effecting a braking torque on wheels of a vehicle, at least one electromechanical actuator controller (EMAC) for providing drive control of the brake actuators in response to brake command signals, and a plurality of brake control units (BSCUs) for converting an input brake command signal into the brake command signals which are provided to the at least one EMAC, the method comprising:

configuring at least two of the plurality of BSCUs to function redundantly in providing brake command signals directly to the at least one EMAC in response to the input brake command signal; and providing power to the at least two BSCUs via respective power busses having different power sources.

7. The method of claim 6, wherein the vehicle is an aircraft.

8. The method of claim 7, wherein the two BSCUs receive power from power busses based on different engines included in the aircraft.

9. A method for controlling braking in an electromechanical braking system comprising at least one brake actuator for effecting a braking torque on a wheel of a vehicle, at least one electromechanical actuator controller (EMAC) for providing drive control of the brake actuator in response to brake command signals, and at least one brake control unit (BSCU) for converting an input brake command signal into the brake command signals which are provided to the EMAC, the BSCU providing antiskid operations in relation to the input brake command signal, the method comprising:

under predefined normal braking conditions, inputting the input brake command signal to the BSCU to obtain a brake command signal which is provided to the EMAC to implement braking; and under predefined parking conditions, inputting the input brake command signal directly to the EMAC so as to bypass the BSCU and implement braking.

10. The method of claim 9, wherein the input brake command signal represents a proportional signal.

11. The method of claim 9, wherein the vehicle is an aircraft.

* * * * *